United States Patent
Hatsuda et al.

(10) Patent No.: US 11,139,762 B2
(45) Date of Patent: Oct. 5, 2021

(54) MOTOR CONTROL DEVICE

(71) Applicant: NIDEC TOSOK CORPORATION, Kanagawa (JP)

(72) Inventors: Tadayuki Hatsuda, Kanagawa (JP); Yoshihisa Okuhata, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 322 days.

(21) Appl. No.: 16/232,089

(22) Filed: Dec. 26, 2018

(65) Prior Publication Data
US 2019/0199250 A1   Jun. 27, 2019

(30) Foreign Application Priority Data
Dec. 27, 2017   (JP) .............................. JP2017-252405

(51) Int. Cl.
| H02P 6/10 | (2006.01) |
| H02M 7/5387 | (2007.01) |
| H02M 3/158 | (2006.01) |
| H02P 6/16 | (2016.01) |
| H02K 11/00 | (2016.01) |
| H02K 11/33 | (2016.01) |
| H02M 1/00 | (2006.01) |

(52) U.S. Cl.
CPC .............. *H02P 6/10* (2013.01); *H02M 3/158* (2013.01); *H02M 7/53871* (2013.01); *H02K 11/0094* (2013.01); *H02K 11/33* (2016.01); *H02M 1/007* (2021.05); *H02M 1/0048* (2021.05); *H02P 6/16* (2013.01); *H02P 2201/09* (2013.01)

(58) Field of Classification Search
CPC .......... H02P 6/10; H02P 6/16; H02P 2201/09; H02M 3/158; H02M 7/53871; H02M 2001/0048; H02M 2001/007; H02K 11/33; H02K 11/0094
See application file for complete search history.

(56) References Cited

U.S. PATENT DOCUMENTS

| 2006/0098461 A1* | 5/2006 | Lee | ................... H02M 3/33507 363/17 |
| 2013/0057172 A1* | 3/2013 | Kumar | ................... H05B 41/40 315/201 |
| 2013/0229741 A1* | 9/2013 | Yuasa | .................. H02H 1/0038 361/104 |

FOREIGN PATENT DOCUMENTS

JP    2010130807    6/2010

* cited by examiner

Primary Examiner — Zoheb S Imtiaz
(74) Attorney, Agent, or Firm — JCIPRNET

(57) ABSTRACT

A motor control device includes: a voltage boosting circuit that boosts a power source voltage supplied from an outside; a condenser that smooths a voltage output by the voltage boosting circuit; an inverter circuit that generates a drive voltage of a motor by switching a voltage output by the voltage boosting circuit and smoothed by the condenser; and a control part that causes the voltage boosting circuit to bypass and causes the power source voltage to be supplied to the inverter circuit, and a distance between the voltage boosting circuit and the inverter circuit is a distance with which a parasitic inductance is equal to or less than a predetermined value.

5 Claims, 6 Drawing Sheets

MOTOR CONTROL DEVICE

CROSS REFERENCE TO RELATED APPLICATIONS

The present application claims priority under 35 U.S.C. § 119 to Japanese Patent Application No. 2017-252405 filed on Dec. 27, 2017. The entire content of which is incorporated herein by reference.

BACKGROUND

Technical Field

The disclosure relates to a motor control device that performs motor drive control.

Description of Related Art

A technology for controlling the motor drive power that serves as the power for a vehicle or the like using an inverter circuit is known.

In relation to a motor power source device in the related art for example, a technology of providing a voltage boosting converter that boosts a power source voltage and setting a running region in which the voltage boosting operation is performed in accordance with a user's requested level of acceleration has been disclosed.

However, the power source device for a motor in the related art requires a condenser that smooths voltages before and after a voltage boosting circuit. Also, although a condenser that smooths the voltage to be input to the inverter may be further required depending on the arrangement of the voltage boosting circuit and the inverter, this is not taken into consideration for the power source device for a motor in the related art. Therefore, there is room for improvement in terms of size reduction of the motor including a control device.

SUMMARY

According to an exemplary embodiment of the disclosure, there is provided a motor control device including: a voltage boosting circuit that boosts a power source voltage supplied from outside; a condenser that smooths a voltage output by the voltage boosting circuit; an inverter circuit that generates a drive voltage of a motor by switching a voltage output by the voltage boosting circuit and smoothed by the condenser; and a control part that causes the voltage boosting circuit to bypass and causes the power source voltage to be supplied to the inverter circuit. A distance between the voltage boosting circuit and the inverter circuit is a distance with which parasitic inductance is equal to or less than a predetermined value.

The above and other elements, features, steps, characteristics and details of the embodiments of the disclosure will become more apparent from the following detailed description of the embodiments with reference to the attached drawings.

DESCRIPTION OF THE EMBODIMENTS

In view of the aforementioned, the embodiments of the disclosure provide a motor control device capable of reducing the number of condensers that smooth voltages of the voltage boosting circuit and the inverter circuit and contributing to size reduction of the motor.

Hereinafter, an embodiment for implementing the disclosure will be described in detail with reference to the accompanying drawings.

Figure 1:
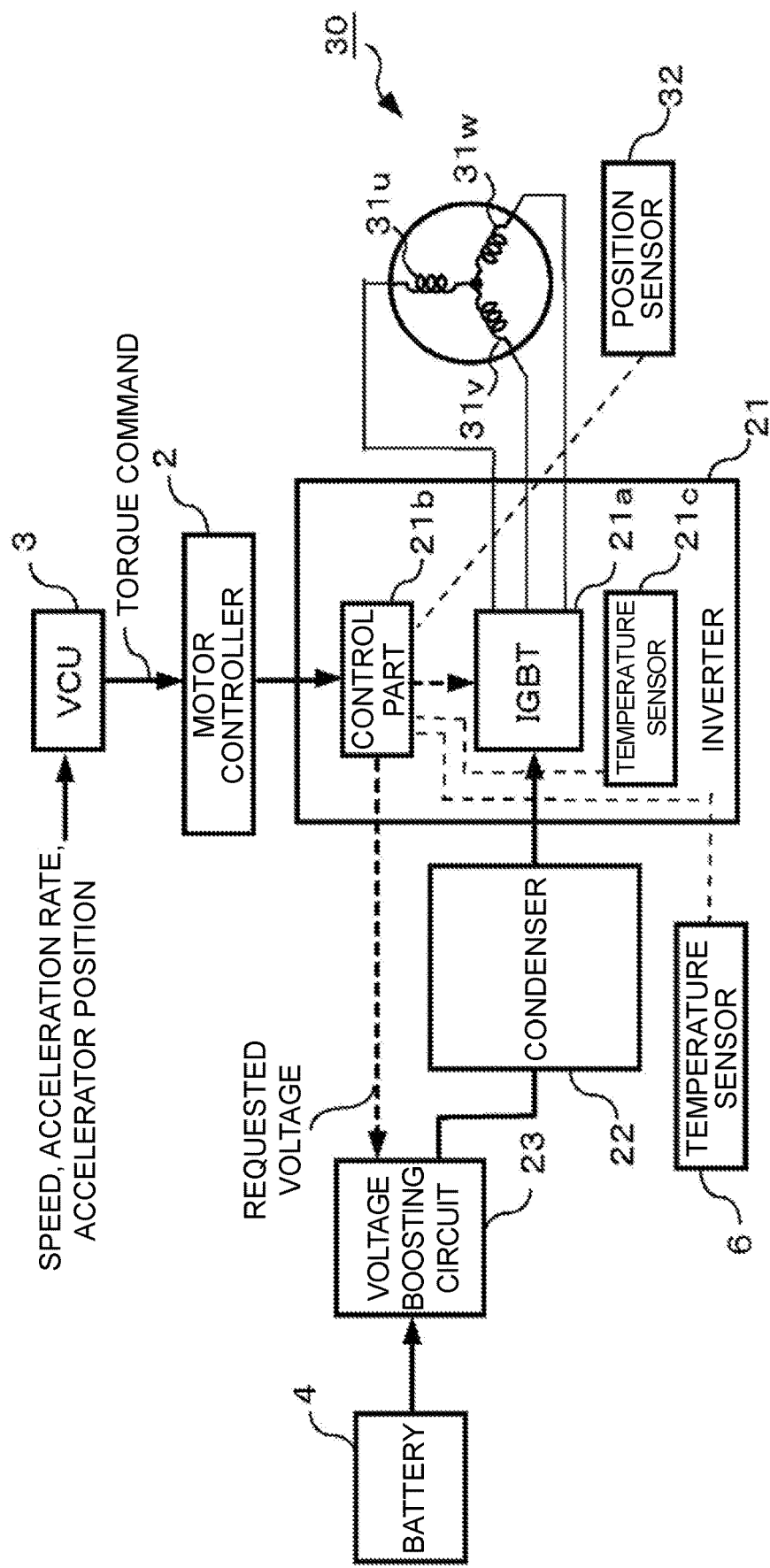
FIG. 1 is a block diagram illustrating a configuration example of a motor control device according to an embodiment of the disclosure.

FIG. 1 is a block diagram illustrating a configuration example of a motor control device according to the embodiment.

The motor control device includes a motor controller 2 that controls operations of a motor, a vehicle control unit (VCU) 3 that supplies a torque designation value (torque command) to the motor controller 2 in accordance with vehicle states such as a speed, an acceleration, an accelerator position, and the like of a vehicle or the like, an inverter 21 that supplies the drive voltage to field coils 31$u$, 31$v$, and 31$w$ that are provided at a stator 30 of the motor, a condenser 22 that smooths a power source voltage to be supplied to the inverter 21, a voltage boosting circuit 23 that boosts the power source voltage supplied from a battery 4 in accordance with a designation (requested voltage) from the inverter 21, and a temperature sensor 6 that detects a temperature or the like in the surroundings of the motor.

A distance between the voltage boosting circuit 23 and the inverter 21 is set such that a parasitic inductance of a supply path through which the voltage output by the voltage boosting circuit 23 is supplied to the inverter 21 is equal to or less than a predetermined value. In this manner, it is possible to share the condenser 22 that smooths the voltage of the inverter 21 with the voltage boosting circuit 23. Therefore, it is possible to reduce the number of condensers and to contribute to size reduction of the motor. In addition, the condenser 22 is a shared condenser which is a condenser that smooths the voltage output by the voltage boosting circuit 23 and a condenser that smooths a voltage input by the inverter 21. The value of capacitance of the condenser 22 is set such that a ripple value of the voltage supplied from the voltage boosting circuit 23 to the inverter 21 is equal to or less than a predetermined value. Since the size of the condenser 22 increases in accordance with the capacitance, it is possible to contribute to size reduction of the motor without unnecessarily increasing the capacitance of the condenser by setting the value of the capacitance in this manner.

The inverter 21 includes an insulated gate bipolar transistor (IGBT) module (hereinafter, simply referred to as an IGBT) 21$a$ that switches the voltage supplied from the voltage boosting circuit 23 via the condenser 22 and generates three-phase (a U phase, a V phase, and a W phase) drive voltages to be supplied to the field coils 31$u$, 31$v$, and 31$w$, a control part 21$b$ that performs overall control of the inverter 21, and a temperature sensor 21c that detects a temperature of the IGBT 21a or the like.

Figure 2:
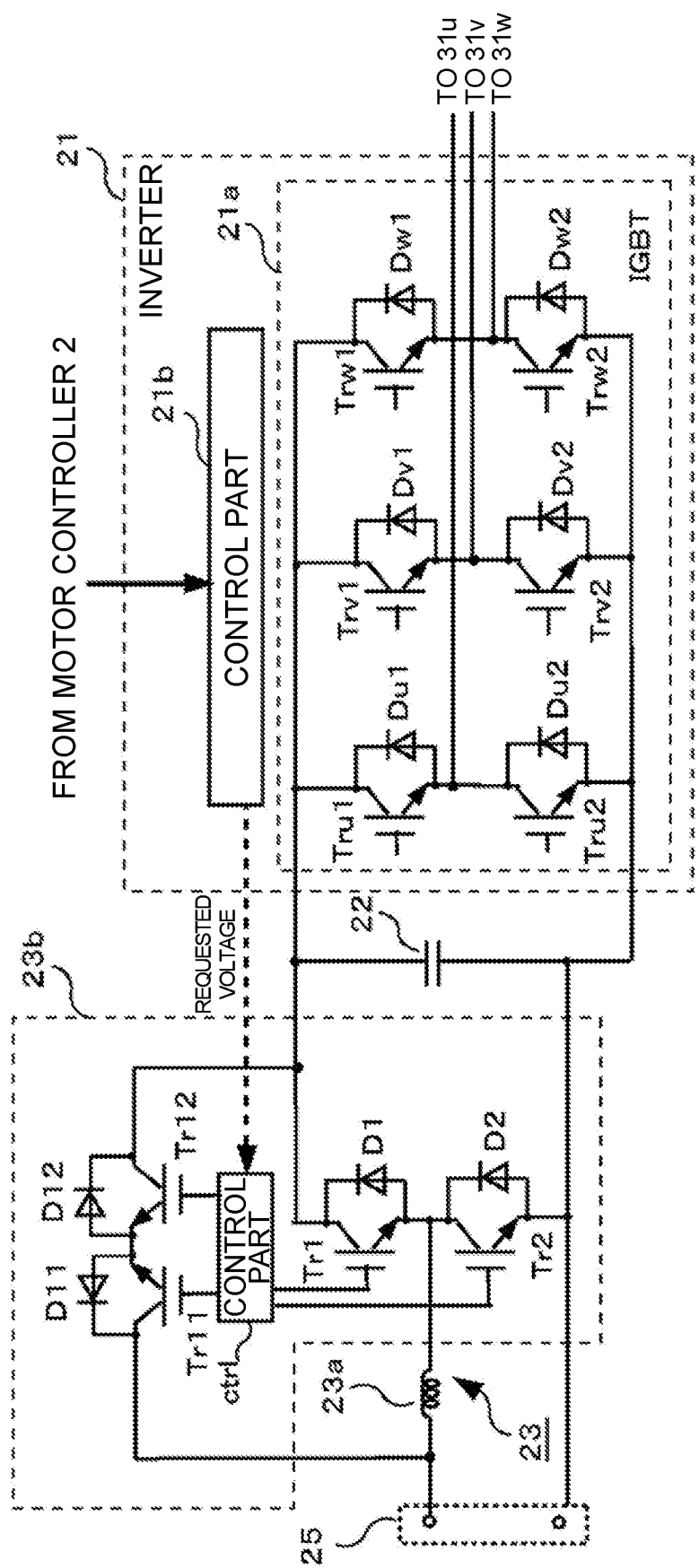
FIG. 2 is a circuit diagram illustrating configuration examples of a voltage boosting circuit and an inverter.

In addition, the IGBT 21a includes three sets of, namely six switching elements (IGBT elements) Tru 1, Tru 2, Try 1, Try 2, Trw 1, and Trw 2 as illustrated in FIG. 2, for example, to generate the three-phase drive voltages. Note that switching elements such as metal oxide semiconductor field effect transistors (MOSFET) or the like may be used instead of the IGBT elements. Regenerative diodes Du 1, Du 2, Dv 1, Dv 2, Dw 1, and Dw 2 that supply regenerative currents supplied from the field coils 31u, 31v, and 31w to the voltage boosting circuit 23 via the condenser 22 at the time of deceleration or the like are connected to the respective switching elements Tru 1, Tru 2, Try 1, Try 2, Trw 1 and Trw 2. Also, the control part 21b supplies a requested voltage to the voltage boosting circuit 23.

The voltage boosting circuit 23 is a chopper-type voltage boosting circuit and includes a control part ctrl that performs overall control of the voltage boosting circuit 23, a reactor 23a to which the power source voltage is supplied from the battery 4 via a power source connector 25, switching elements Tr1 and Tr2 that perform switching of the voltage from the reactor 23a, and switching elements Tr11 and Tr12 that output the power source voltage in a bypassing manner. The regenerative diodes D1, D2, D11, and D12 are connected to the respective switching elements Tr1, Tr2, Tr11, and Tr12. In addition, the respective switching elements Tr1, Tr2, Tr11, and Tr12, the control part ctrl, and the like are mounted on a circuit board 23b. A connection destination (that is, a bypassing destination of the power source voltage) of a source of the switching element Tr12 may be between the voltage boosting circuit 23 and the condenser 22, and may be a source of the switching element Tr1 (that is, on an output side of the boosted voltage) inside the voltage boosting circuit 23 as illustrated in FIG. 2. This is because if the wiring is provided in the circuit board 23b, the parasitic inductance has less influence.

The VCU 3 generates a torque command indicating a value of a necessary torque in accordance with vehicle states such as a current accelerator position, a vehicle speed, and an acceleration rate at the time of acceleration or deceleration and supplies the torque command to the motor controller 2. The motor controller 2 controls operations of the control part 21b in accordance with the supplied torque command.

The control part 21b compares the voltage detected by the position sensor 32 provided in the motor, for example, with a predetermined reference voltage and detects an angle of a rotor of the motor in accordance with a result of comparison. In addition, the control part 21b detects a rotational speed of the motor on the basis of the voltage detected by the position sensor 32. Note that the rotational speed of the motor may be detected by using a sensor that is different from the position sensor 32.

Figure 3:
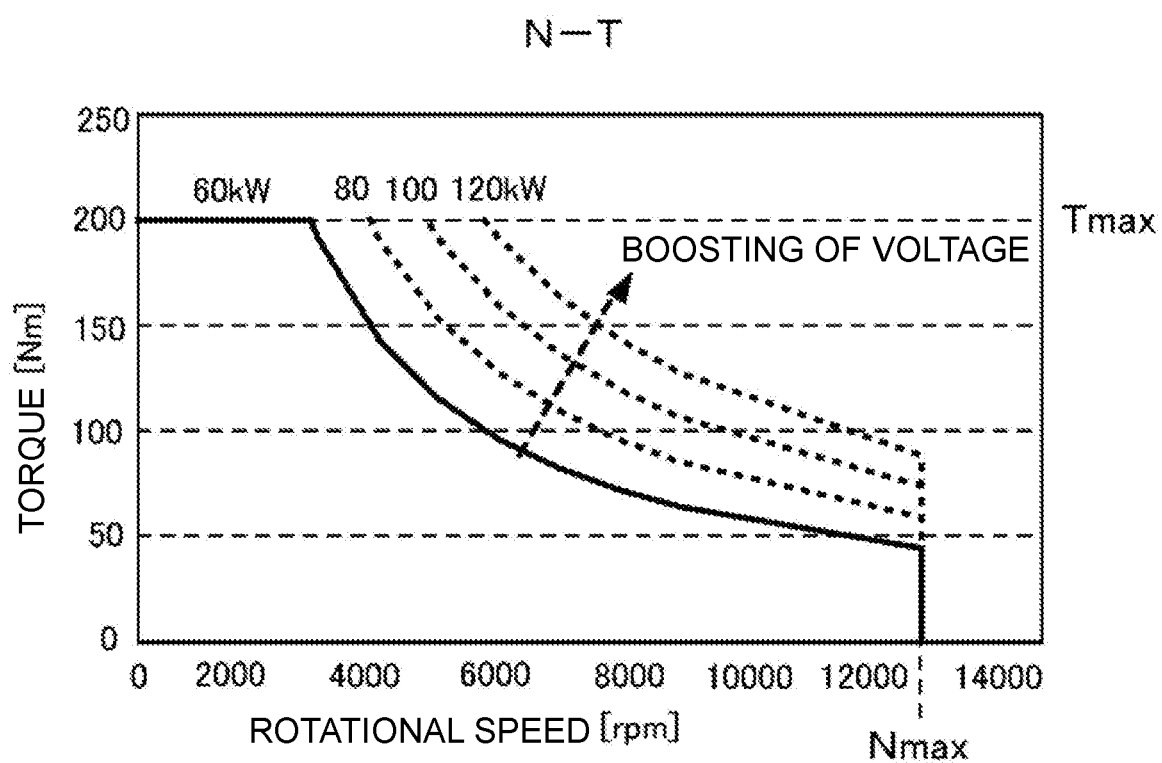
FIG. 3 is a diagram illustrating a relationship of power consumption of a motor, a rotational speed N of the motor, and a torque T.

The motor controller 2 calculates necessary power that is necessary to drive the motor in accordance with the torque command from the VCU 3. A relationship between the rotational speed N of the motor and the torque T changes in accordance with a power consumption of the motor as illustrated in FIG. 3, for example. A relationship between the rotational speed N of the motor and the torque T is as represented by the solid line in the drawing when the power consumption is 60 kW and is as represented by the respective dashed lines when the power consumption is 80 kW, 100 kW, and 120 kW. Therefore, the motor controller 2 calculates the power consumption with which a necessary torque is obtained as a necessary power in accordance with the torque command and the rotational speed of the motor on the basis of such a relationship and controls operations of the control part 21b. The control part 21b calculates a voltage value and a current value that are necessary to drive the motor in accordance with the control performed by the motor controller 2. Note that in a case in which the necessary power is equal to or less than a predetermined threshold value, the control part 21b sets the voltage value to a power source voltage ($V_{BATT}$) of the battery 4. Also, the control part 21b supplies the calculated voltage value as a requested voltage to the control part ctrl of the voltage boosting circuit 23.

The control part ctrl of the voltage boosting circuit 23 supplies the voltage V boosted at a predetermined voltage boosting ratio from the power source voltage ($V_{BATT}$) of the battery 4 to the inverter 21 in accordance with the requested voltage from the control part 21b. Specifically, the control part ctrl controls turning the switching elements Tr1 and Tr2 ON and OFF in accordance with the requested voltage and boosts the power source voltage ($V_{BATT}$) of the battery 4. Note that in a case in which the requested voltage is the power source voltage ($V_{BATT}$) of the battery 4, the control part ctrl brings the switching elements Tr11 and Tr12 into an ON state and brings the switching elements Tr1 and Tr2 into an OFF state. In this manner, the power source voltage ($V_{BATT}$) of the battery 4 is supplied directly to the inverter 21 via the condenser 22. The necessary power is calculated in accordance with the aforementioned torque designation value as described above, in other words, the control part 21b causes the power source voltage ($V_{BATT}$) of battery 4 to perform bypassing and to be supplied to the inverter 21 in a case in which the torque designation value is equal to or less than a predetermined threshold value. In this manner, since the power source voltage is not boosted in a case in which the torque designation value is equal to or less than the predetermined threshold value, it is possible to reduce heat generation of the reactor 23a, the switching elements Tr1 and Tr2, and the like.

The control part 21b controls switching performed by the respective switching elements of the IGBT 21a in accordance with the current value calculated as described above and causes the switching elements to generate three-phase (the U phase, the V phase, and the W phase) drive voltages. The drive voltages are generated by performing pulse width modulation (PWM) control such that an effective value of the drive current flowing through the field coils 31 (field coils 31u to 31w) of the motor (hereinafter, simply referred to as a current value) is a predetermined current value in a case of sine wave driving, for example. The control part 21b controls a pulse duty ratio of the drive voltages in accordance with the aforementioned current value. Specifically, the control part 21b changes a modulation level of the PMW in accordance with the current value I.

The drive voltages of the respective phases generated by the IGBT 21a are supplied to the respective field coils 31u to 31w of the stator 30, and the drive current in accordance with the drive voltages flows through the respective field coils 31u to 31w, and a torque is generated at the rotor by mutual actions between the magnetic field of the field coils 31u to 31w and the magnet of the rotor. The torque is output to the outside via an output end of a motor shaft.

Figure 4:
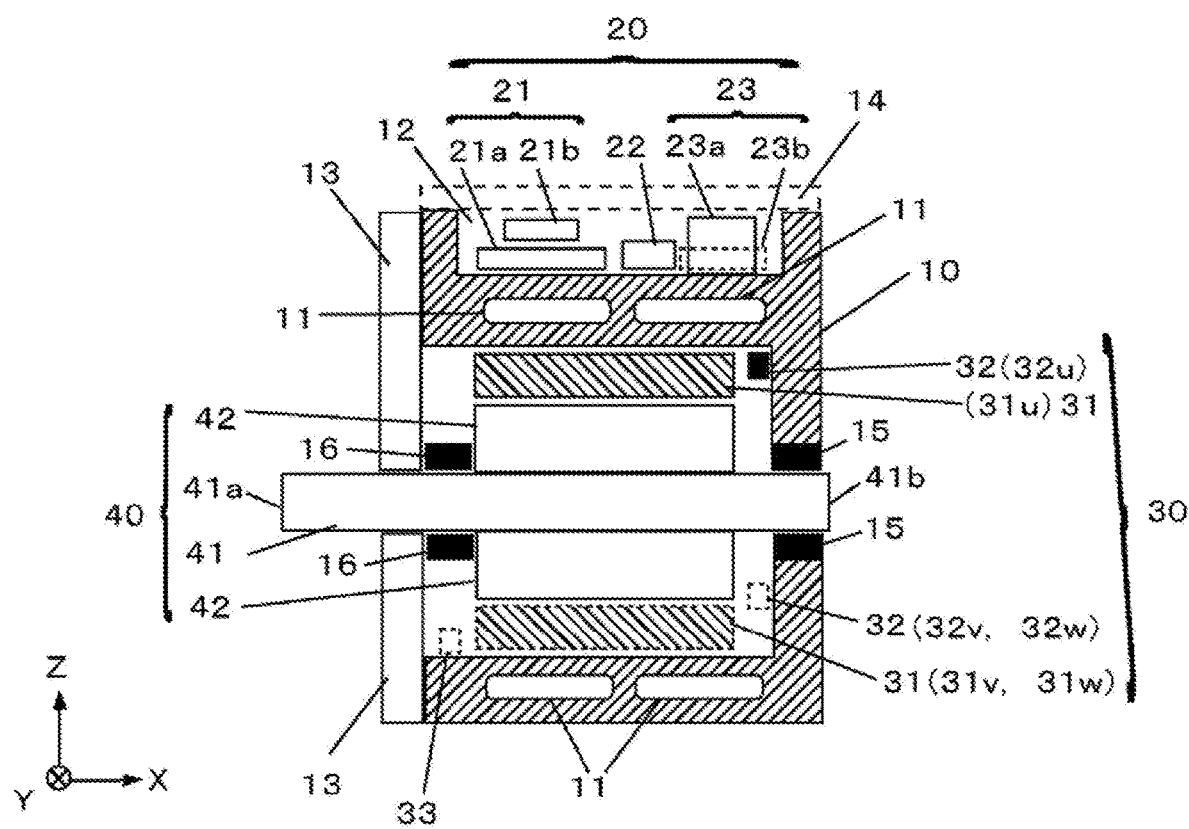
FIG. 4 is a vertical sectional view illustrating a configuration example of the motor.
Figure 5:
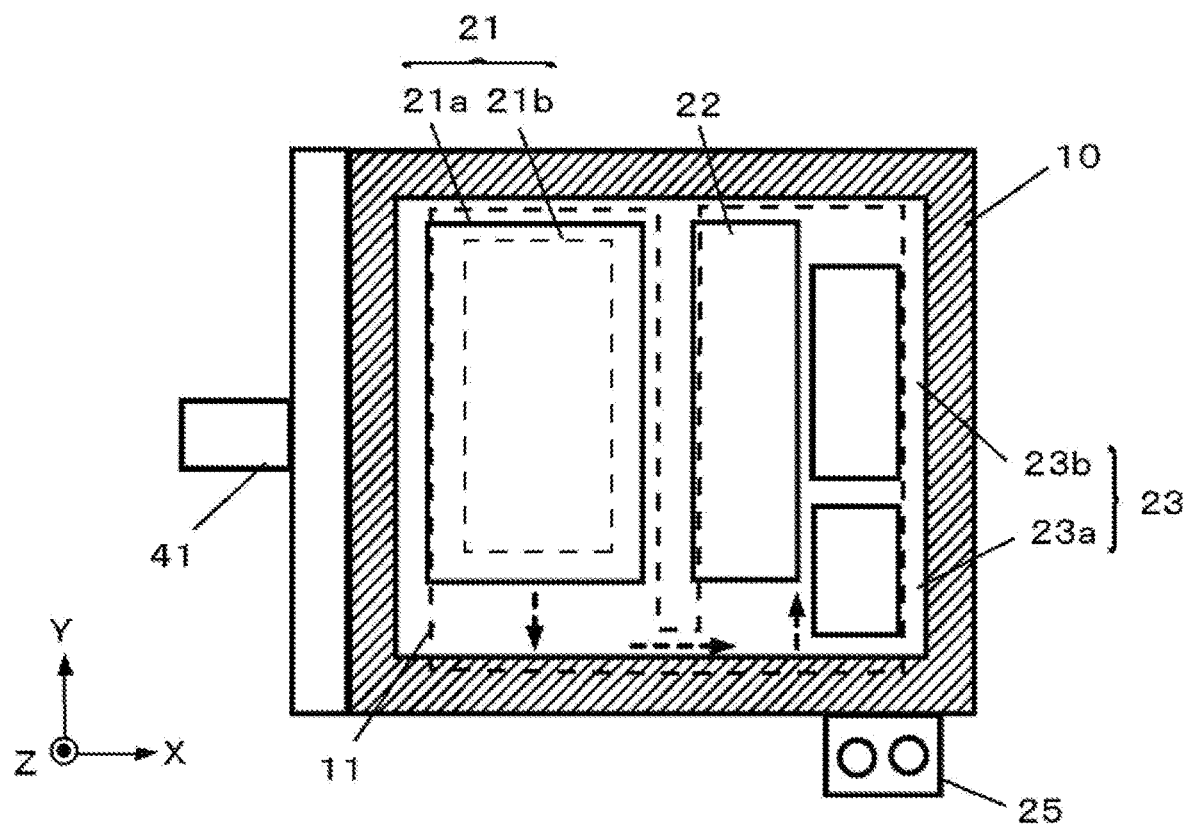
FIG. 5 is a horizontal sectional view illustrating a configuration example of the motor.

FIGS. 4 and 5 illustrate configuration examples of a DC brushless motor that is formed using the aforementioned motor control device.

The motor includes a control circuit 20 that is accommodated in a housing 10, a stator 30 that has field coils 31 and the like that generate a magnetic field using the drive current in accordance with the three-phase drive voltages, and a rotor 40 that is mounted such that the rotor 40 may freely turns about a rotation axis. Note that hereinafter, the motor in which the control circuit 20 is accommodated in the housing 10 along with the stator 30 and the rotor 40 in this manner is referred to as an electromechanical integration-type motor.

A coolant flow path 11 that circulates a coolant is formed inside the housing 10. The housing 10 is cooled by circulating the coolant flowing through the coolant flow path 11, and the stator 30 and the control circuit 20 that are in contact with the housing 10 are cooled. Also, an accommodation part 12 that accommodates the control circuit 20 is provided above the housing 10.

In addition, a cap 13 of a motor housing in which the stator 30 and the rotor 40 are accommodated and an accommodation part cover 14 that covers the accommodation part 12 are provided in the housing 10. Bearings 15 and 16 that support a motor shaft 41 of the rotor 40 are attached to the inside of the motor housing.

The aforementioned inverter 21, the condenser 22, and the voltage boosting circuit 23 are included in the control circuit 20. The inverter 21 and the voltage boosting circuit 23 are attached at a position at which the inverter 21 and the voltage boosting circuit 23 overlap with the coolant flow path 11 in a diameter direction of the motor. In other words, at least the coolant flow path 11 is provided at a position at which the coolant flow path 11 overlaps with the inverter 21 and the voltage boosting circuit 23 in a direction away from the rotation center axis (motor shaft 41) of the rotor 40, that is, the diameter direction of the motor (the Z direction in FIGS. 4 and 5). In this manner, it is not necessary to provide the coolant flow path 11 at the tip of the center axis of the motor shaft 41, and it is possible to contribute to size reduction of the rotor 40 in the rotation center axis (the center axis of the motor shaft 41) direction.

Figure 6:
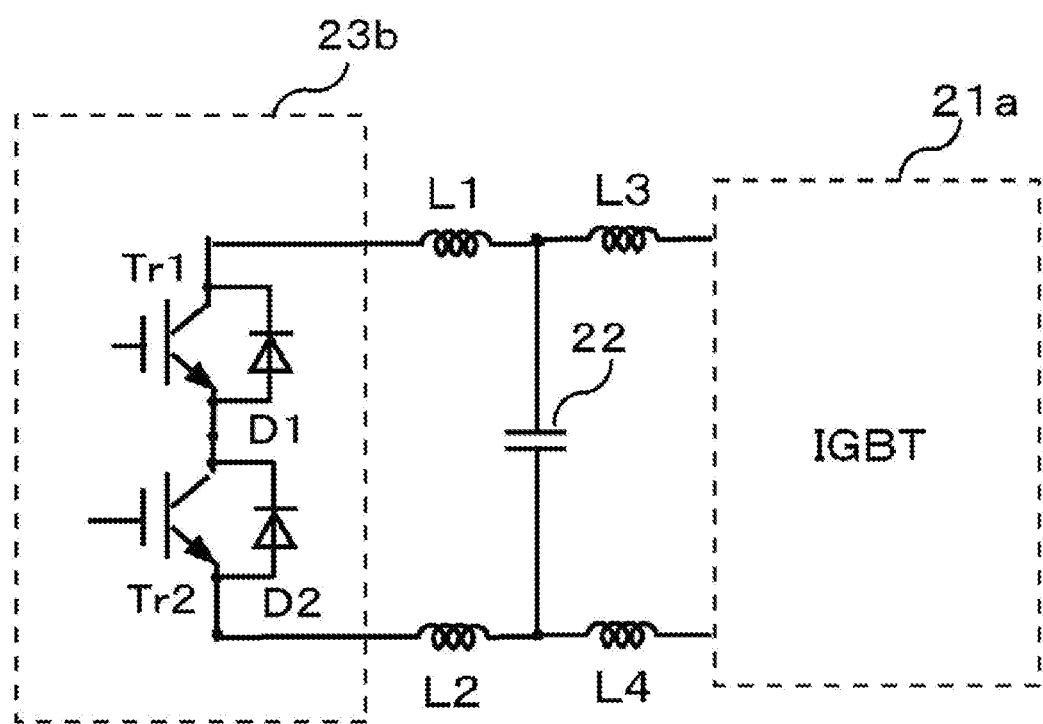
FIG. 6 is a diagram illustrating an example of an equivalent circuit of a transmission line between a voltage boosting circuit and an IGBT.

As described above, the distance between the voltage boosting circuit 23 and the inverter 21 is set such that the parasitic inductance of the supply path through which the voltage output by the voltage boosting circuit is supplied to the inverter is equal to or less than a predetermined value. FIG. 6 illustrates an example of an equivalent circuit of the supply path between the circuit board 23b of the voltage boosting circuit 23 and the IGBT 21a.

L1, L2, L3, and L4 represent parasitic inductances of a transmission line (wiring) between the circuit board 23b and the IGBT 21a.

The ripple voltage $V_L$ at both ends of the parasitic inductance is obtained by the following equation (1).

$$V_L = L \cdot di/dt \tag{1}$$

Here, L represents the parasitic inductance, and di/dt represents a rate of change of a current flowing through the IGBT 21a. The value of the parasitic inductance is 10 nH per 1 cm, for example. Also, the rate of change of a current is 100 A/μs, for example. Therefore, a ripple voltage of 1 V per a wiring distance of 1 cm between the circuit substrate 23b and the IGBT 21a is generated.

Therefore, an allowable ripple voltage is decided depending on a relationship between the capacitance of the condenser 22 and the operations of the inverter 21, a value of an allowable parasitic inductance is obtained from the decided ripple voltage, and the distance between the circuit board 23b and the IGBT 21a is decided. In this manner, a distance between the voltage boosting circuit 23 and the inverter 21 is set such that the parasitic inductance is equal to or less than the predetermined value. By employing such a distance, it is possible to use the common condenser 22 as the condenser that smooths the voltage output by the voltage boosting circuit 23 and as the condenser that smooths the voltage input by the inverter 21.

Note that although the drive voltage of the motor is generated by sine wave driving in the aforementioned embodiments, the drive voltage may be generated by rectangular wave driving instead of sine wave driving.

In addition, although the case in which the drive control of the DC brushless motor is performed, for example, has been described in the aforementioned embodiments, the present disclosure can be applied to a case in which drive control of a three-phase synchronous motor or the like is performed by using an inverter.

Features of the above-described embodiments and the modifications thereof may be combined appropriately as long as no conflict arises.

While the embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A motor control device comprising:
   a voltage boosting circuit that boosts a power source voltage that is supplied from an outside;
   a condenser that smooths a voltage output by the voltage boosting circuit;
   an inverter circuit that generates a drive voltage of a motor by switching a voltage output by the voltage boosting circuit and smoothed by the condenser; and
   a control part that causes the voltage boosting circuit to bypass and causes the power source voltage to be supplied to the inverter circuit,
   wherein a distance between the voltage boosting circuit and the inverter circuit is a distance with which parasitic inductance is equal to or less than a predetermined value.

2. The motor control device according to claim 1, wherein the control part includes a switching element that causes the power source voltage to bypass between the condenser and the voltage boosting circuit.

3. The motor control device according to claim 1, wherein the capacitance of the condenser is set such that a ripple rate of a voltage supplied from the voltage boosting circuit to the inverter circuit is equal to or less than a predetermined value.

4. The motor control device according to claim 1, further comprising:
   a housing that accommodates a stator that has a field coil and a rotor that is provided such that the rotor freely turns about a rotation center axis,
   wherein the housing has an accommodation part that accommodates the voltage boosting circuit, the condenser, and the inverter circuit.

5. The motor control device according to claim 1, wherein in a case in which a torque designation value supplied from an outside is equal to or less than a predetermined value, the control part causes the power source voltage to perform bypassing and to be supplied to the inverter circuit.

\* \* \* \* \*